(12) United States Patent
Calarco (10) Patent No.: US 9,829,150 B2
(45) Date of Patent: Nov. 28, 2017

(54) AUTOMATIC WATER REFILL APPARATUS FOR AN ABOVE-GROUND POOL

(71) Applicant: Steven Calarco, North Las Vegas, NV (US)

(72) Inventor: Steven Calarco, North Las Vegas, NV (US)

(73) Assignee: Steven Calarco, North Las Vegas, NV (US)

(*) Notice: Subject to any disclaimer, the term of this patent is extended or adjusted under 35 U.S.C. 154(b) by 12 days.

(21) Appl. No.: 15/131,538

(22) Filed: Apr. 18, 2016

(65) Prior Publication Data

US 2016/0356054 A1    Dec. 8, 2016

Related U.S. Application Data

(60) Provisional application No. 62/169,943, filed on Jun. 2, 2015.

(51) Int. Cl.
| | |
|---|---|
| *F16M 13/02* | (2006.01) |
| *G05D 9/00* | (2006.01) |
| *E04H 4/14* | (2006.01) |
| *F16B 2/06* | (2006.01) |

(52) U.S. Cl.
CPC ............ *F16M 13/02* (2013.01); *E04H 4/14* (2013.01); *F16B 2/065* (2013.01); *G05D 9/00* (2013.01)

(58) Field of Classification Search
CPC .......... G05D 9/00; Y10T 137/742; E04H 4/14
USPC ..................................................... 4/507, 508
See application file for complete search history.

(56) References Cited

U.S. PATENT DOCUMENTS

| | | | | |
|---|---|---|---|---|
| 4,574,405 | A * | 3/1986 | Tams ................... | E04H 4/12 137/428 |
| 4,724,552 | A * | 2/1988 | Kinkead .............. | E04H 4/1209 4/508 |
| 4,735,230 | A * | 4/1988 | Detloff ................ | E03D 1/00 137/15.26 |
| 4,972,530 | A * | 11/1990 | Synder ................ | E04H 4/1209 4/496 |
| 5,253,374 | A * | 10/1993 | Langill .............. | E04H 4/12 239/407 |
| 2015/0089733 | A1* | 4/2015 | Sigmon .............. | E04H 4/1218 4/508 |

* cited by examiner

*Primary Examiner* — Janie Loeppke (57) ABSTRACT

An apparatus for automatically filling water in an above-ground pool. The apparatus includes an open-sided enclosure, an inlet pipe, an intermediate pipe, a water-level control valve, and pool mounting mechanism. The open-sided enclosure houses and supports the constituents of the apparatus. The inlet pipe connects to an external water supply and traverses normal and into a top wall of the open-sided enclosure. The intermediate pipe is telescopically engaged into the inlet pipe and fixed to the water-level control valve. This puts the inlet pipe and the water-level control valve in fluid communication. The pool mounting mechanism is mechanically integrated into the open-sided enclosure and attaches the apparatus to a frame of the pool. The water-level control valve manages water being pumped into the pool in order to maintain a constant water level. An actuatable lifter is used to raise or lower the water-level control valve within the open-sided enclosure.

10 Claims, 8 Drawing Sheets

AUTOMATIC WATER REFILL APPARATUS FOR AN ABOVE-GROUND POOL

The current application claims a priority to the U.S. Provisional Patent application Ser. No. 62/169,943 filed on Jun. 2, 2015.

FIELD OF THE INVENTION

The present invention relates generally to above ground pool accessories. More specifically, the present invention is an automatic water leveling system which automatically fills and maintains the water level in any pipe top framed pools and rail top framed pools.

BACKGROUND OF THE INVENTION

Maintaining a proper water level in an above ground pool can be difficult and cumbersome. Throughout the day, an above ground pool will lose water as a result of individuals entering and displacing a small portion of the water and as individuals splash and play in the pool. Typically, this requires the owner of the pool to constantly re-fill the pool to the appropriate level in order to ensure that the recirculating pump is not damaged. Traditionally, re-filling the pool involves the owner dragging a hose to the pool and waiting by it until the water level reaches the appropriate height.

The present invention is an automatic refill apparatus that attaches to the side of an above-ground pool to continuously add water into the pool when a low water level is detected. The present invention requires a single easy installation and is compatible with rail and pipe framed pools. Additionally, the present invention allows the owner to preset the desired water level in the pool to ensure an adequate amount of water is always in the pool.

DETAIL DESCRIPTIONS OF THE INVENTION

All illustrations of the drawings are for the purpose of describing selected versions of the present invention and are not intended to limit the scope of the present invention.

The present invention generally relates to above-ground pool accessories. More specifically, the present invention is an automatic water refill apparatus for above-ground pools. The present invention maintains a constant water level within the pool by adding water anytime the water level drops below a preset limit. Keeping a constant water level in the pool saves time, effort, and upkeep costs for the owner. For example, a constant water level prevents damage to the circulation pump of the pool as it ensures that no air enters the pump. In order to utilize the present invention, the user simply attaches the present invention to a frame of the pool once and connects an external water supply to an inlet pipe 6 of present invention.

Figure 1:
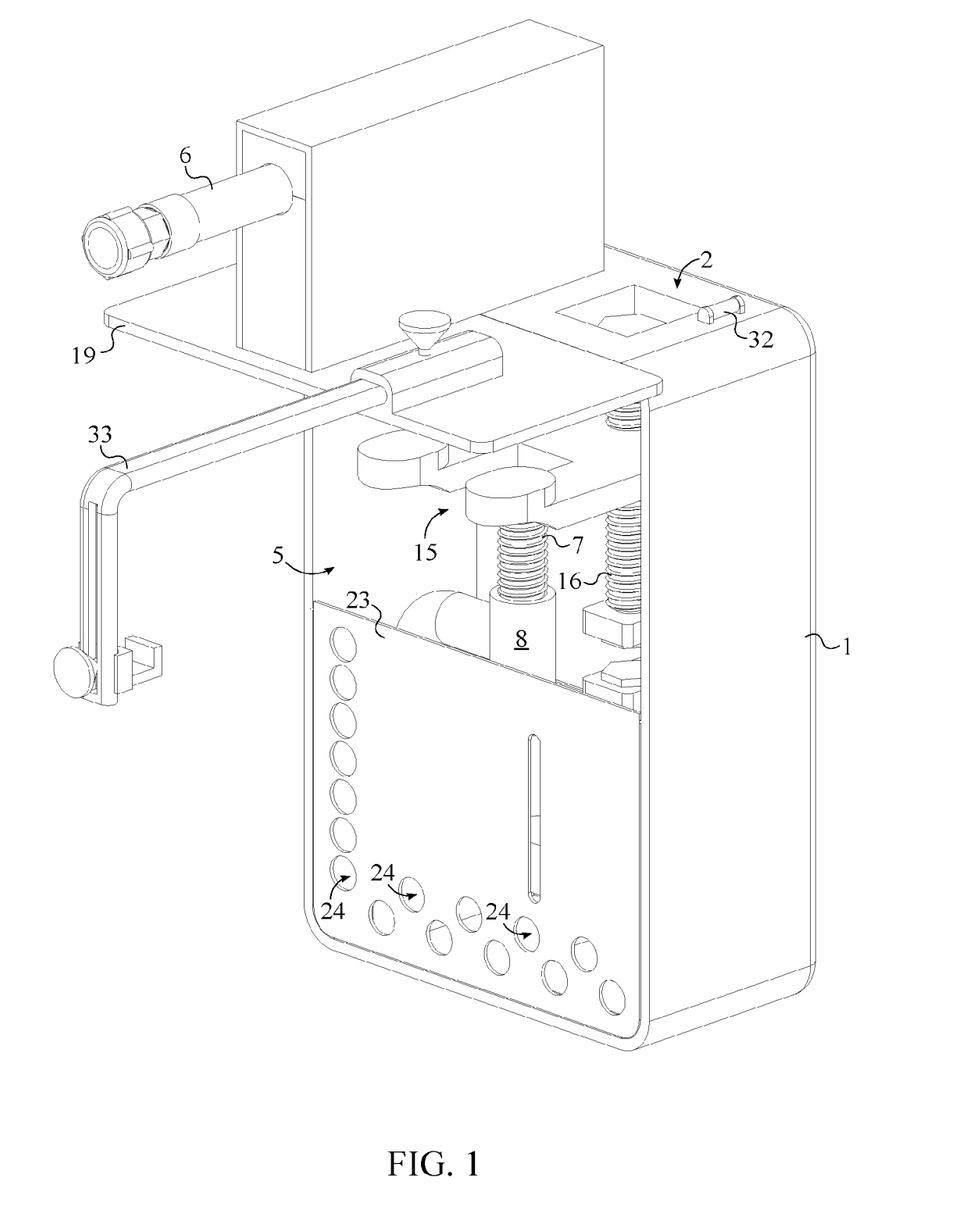
FIG. 1 is a perspective view of the present invention.
Figure 2:
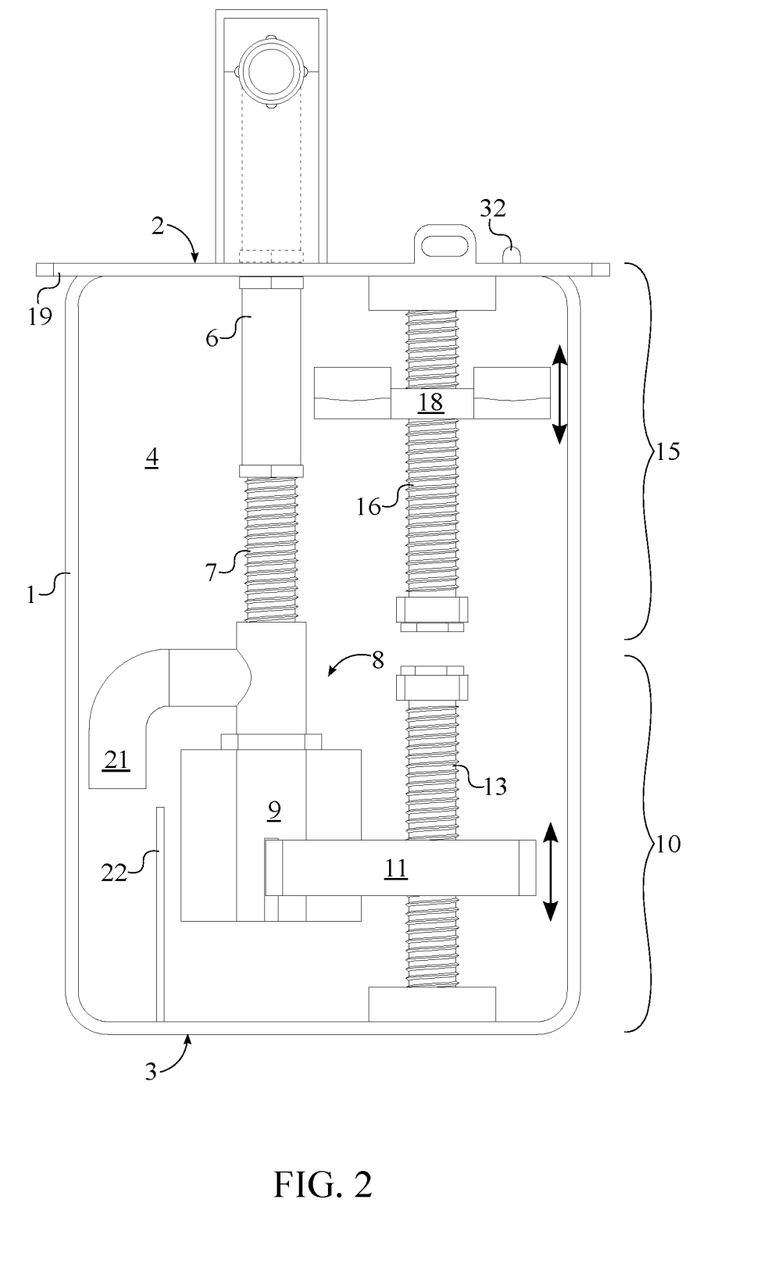
FIG. 2 is a front view of the present invention with the cover plate and the adjustable hook-like bracket removed.
Figure 3:
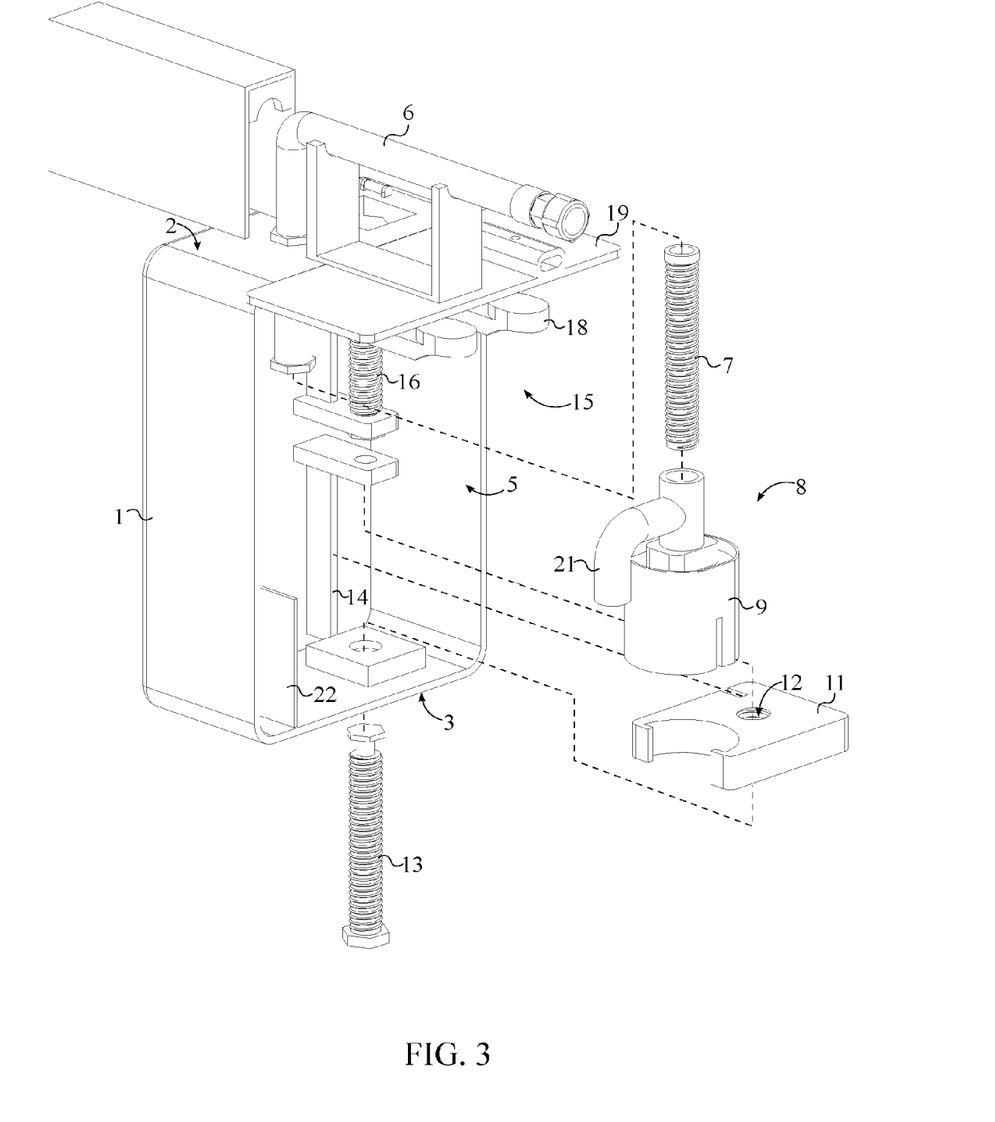
FIG. 3 is a partially exploded perspective view of the present invention with the cover plate and the adjustable hook-like bracket removed.

Referring to FIG. 1 through FIG. 3, the present invention comprises an open-sided enclosure 1, the inlet pipe 6, an intermediate pipe 7, a water-level control valve 8, an actuatable lifter 10, and a pool mounting mechanism 15. The open-sided enclosure 1 houses and supports the constituents of the present invention. In particular, the intermediate pipe 7, the water-level control valve 8, and the actuatable lifter 10 are positioned and supported within the open-sided enclosure 1. The open-sided enclosure 1 is preferably a hollowed structure that is cuboid shaped with an open lateral side-wall as seen in FIG. 3. The inlet pipe 6 is used to connect the present invention to an external water supply source. The inlet pipe 6 traverses normal and into a top wall 2 of the open-sided enclosure 1 and is fixed to the open-sided enclosure 1. Resultantly, a portion of the inlet pipe 6 is positioned external to the open-sided enclosure 1 and an another portion of the inlet pipe 6 is positioned internal to the open-sided enclosure 1. The external portion of the inlet pipe 6 couples to a water supply, e.g. a water hose, through a brass hose fitting. The internal portion of the inlet pipe 6 is connected to the water-level control valve 8 by the intermediate pipe 7. This configuration puts the water-level control valve 8 and the inlet pipe 6 in fluid communication with each other through the intermediate pipe 7. Additionally, the intermediate pipe 7 physically connects the inlet pipe 6 to the water-level control valve 8. A first end of the intermediate pipe 7 is telescopically engaged into the inlet pipe 6. A second end of the intermediate pipe 7 is fixed to the water-level control valve 8, opposite the inlet pipe 6. This allows the intermediate pipe 7, and therefore the water-level control valve 8, to translate along a main axis of the inlet pipe 6, thus raising or lowering the water-level control valve 8 within the open-sided enclosure 1.

The water-level control valve 8 regulates the flow of water from the inlet pipe 6 into the pool by opening or closing a valve based on a current water level within the pool. As a result, the water-level control valve 8 helps maintain a constant water level inside the pool. A variety of devices may be used for the water-level control valve 8. Generally speaking, a water-level control valve 8 most often times comprises a floatation actuator that is mechanically coupled to a control valve. The floatation actuator is positioned within a housing 9 of the water-level control valve 8 and is exposed to the water within the pool through a multitude of holes in the housing 9. When the water level rises above the height of the floatation actuator, it raises the flotation actuator as well. As a result, the flotation actuator applies a closing force on the control valve, thus putting the control valve into a closed state. if the water level drops, so does the floatation actuator. This configures the control valve into an open state, thus allowing water to flow into the pool until the water level reaches the flotation actuator and once again closes the control valve. Through this configuration, a feedback loop system is created which maintains a constant water level within the pool. As a result, the vertical position of the water-level control valve 8 determines the water level setting to which the feedback loop system returns to. A variety of mechanisms and designs may be used for the water-level control valve 8.

The vertical position of the water-level control valve 8 is directly controlled and set by the actuatable lifter 10. Referring to FIG. 3, The actuatable lifter 10 is attached in between a housing 9 of the water-level control valve 8 and the open-sided enclosure 1. The actuatable lifter 10 allows a user to raise or lower the water-level control valve 8 relative to the open-sided enclosure 1 in order to set a desired water level for the pool. When the water in the pool dips below the desired water level, the water-level control valve 8 is actuated and allows water to flow into the pool until the desired water level is reached. The ideal setting for the desired water level is determined by measuring the position of skimmer. More specifically, the desired water level is preferably the middle of the skimmer entrance hole and is identified by a measuring the distance from the top of the frame of the pool to the middle of the skimmer entrance hole. The pool mounting mechanism 15 is mechanically integrated into the open-sided enclosure 1 and serves as the means for securing/attaching the present invention to the frame of the pool. The present invention is compatible with pipe or rail top framed pools.

Referring to FIG. 3, in the preferred embodiment of the present invention, the actuatable lifter 10 utilizes a mechanical linear actuator in order to raise or lower the water-level control valve 8. More specifically, the actuatable lifter 10 comprises a lifter body 11, a first female threaded hole 12, a first guiding rail 14, and a first height-adjustment screw 13. The lifter body 11 is attached about the housing 9 of the water-level control valve 8 and is preferably U-shaped with a central gap that is sized to receive the housing 9 of the water-level control valve 8. The first female threaded hole 12 traverses through the lifter body 11 and is oriented normal to the top wall 2 of the open-sided enclosure 1. The first female threaded hole 12 contains female threading complimentary to the first height-adjustment screw 13. The first height-adjustment screw 13 is rotatably mounted to a bottom wall 3 of the open-sided enclosure 1 and a rear wall 4 of the open-sided enclosure 1. This allows the first height-adjustment screw 13 to rotate in place about its main axis. The first height-adjustment screw 13 is threadably engaged to the first female threaded hole 12 in order to convert rotational motion of the first height-adjustment screw 13 into translation motion of the lifter body 11, thus lifting or lowering the water-level control valve 8.

The first guiding rail 14 is used to prevent the lifter body 11 from rotating when the first height-adjustment screw 13 is being rotated. The first guiding rail 14 is positioned within the open-sided enclosure 1, adjacent and parallel to the first height-adjustment screw 13. The first guiding rail 14 is preferably a rectangular extrusion that extends along the full length of the first height-adjustment screw 13 and is connected within the open-sided enclosure 1. The lifter body 11 is slidably engaged along the first guiding rail 14. A head of the first height-adjustment screw 13 is positioned external to the bottom wall 3 of the open-sided enclosure 1 to allow the user to engage the actuatable lifter 10 and change/set the height of the water-level control valve 8.

Referring to FIG. 2, the present invention further comprises an outlet pipe 21, a partition 22, a cover plate 23, a plurality of flow holes 24, and a horizontal spirit level 32. The outlet pipe 21 and the partition 22 receive and redirect water flowing out of the water-level control valve 8 away into the pool and away from the housing 9 of the water-level control valve 8. This prevents the water flowing out of the water-level control valve 8 from interacting with the floatation actuator, thus registering as a false water level. The outlet pipe 21 is an elbow pipe and is adjacently connected to the water-level control valve 8. More specifically, the outlet pipe 21 is connected to an outlet of the water-level control valve 8 and is in fluid communication with the water-level control valve 8. The partition 22 is a thin wall-like structure that is positioned in between the outlet pipe 21 and the housing 9 of the water-level control valve 8. The partition 22 is adjacently connected within the open-sided enclosure 1 and extends from the rear wall 4 to a main opening 5 of the open-sided enclosure 1.

The cover plate 23 and the plurality of flow holes 24 act as a debris filter in order to protect the components situated within the open-sided enclosure 1. In particular, the cover plate 23 and the plurality of flow holes 24 prevent debris, such as leaves, from clogging up the water-level control valve 8 and the outlet pipe 21 while simultaneously allowing water to pass through. Referring to FIG. 1, the cover plate 23 is positioned adjacent to the water-level control valve 8, opposite the rear wall 4 of the open-sided enclosure 1. The cover plate 23 is perimetrically attached to the open-sided enclosure 1 and preferably covers more than half of the main opening 5 of the open-sided enclosure 1. The plurality of flow holes 24 is distributed across the cover plate 23 with each of the plurality of flow holes 24 traversing normal and through the cover plate 23. In the preferred embodiment of the present invention, the plurality of flow holes 24 comprises a first set of flow holes and a second set of flow holes. The first set of flow holes is positioned adjacent to the outlet pipe 21 and is distributed along the length of the partition 22. This allows water to enter the pool from the water-level control valve 8. The second set of flow holes is positioned adjacent to the housing 9 of the water-level control valve 8 and is horizontally distributed. This allows water from the pool to enter the open-sided enclosure 1 and interact with the water-level control valve 8.

The horizontal spirit level 32 aids the user in the installation process of the present invention. The horizontal spirit level 32 is adjacently and externally connected to the top wall 2, where the user may easily see if the present invention is horizontally level or not. Additionally, a water level slot may be used so the user may view the level setting of the water-level control valve 8. The water level slot traverses through the cover plate 23, adjacent and along the first height-adjustment screw 13. A plurality of level markings may also be etched into the cover plate 23, adjacent to the water level slot.

Figure 4:
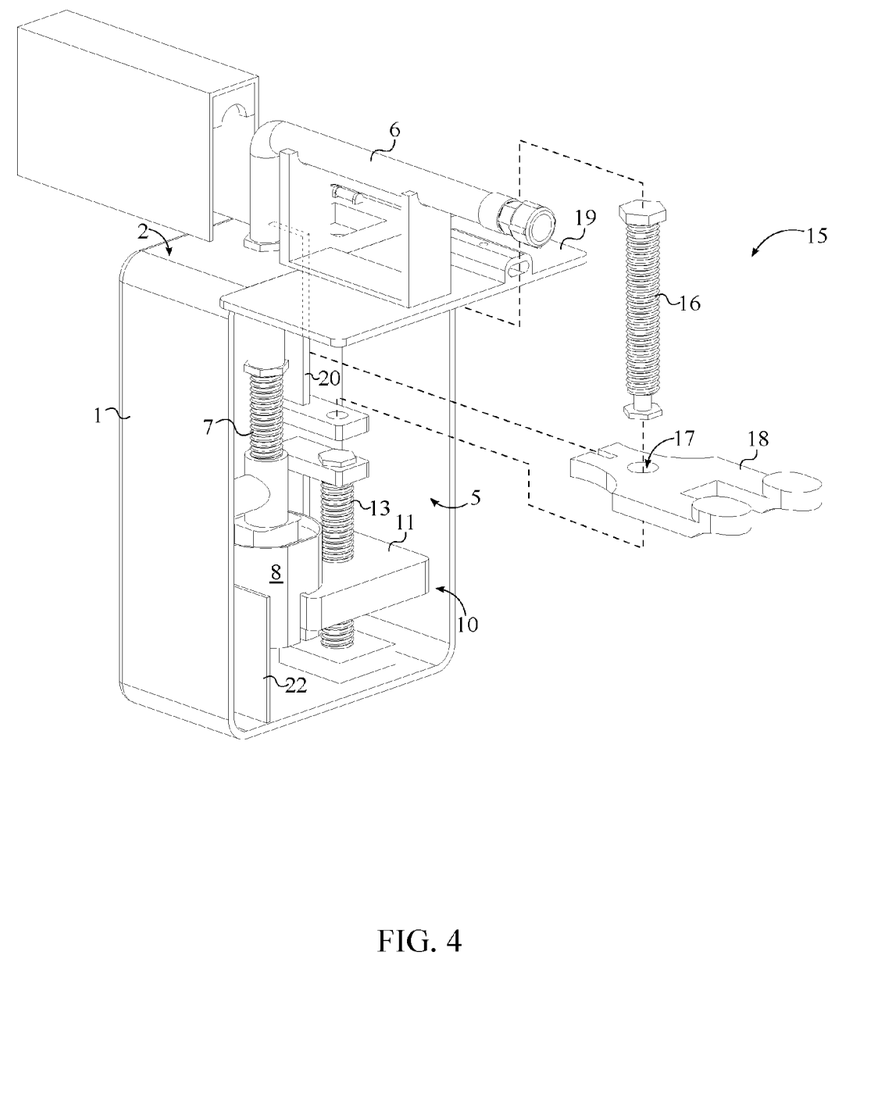
FIG. 4 is a partially exploded perspective view of the present invention with the cover plate and the adjustable hook-like bracket removed, depicting the pool mounting mechanism.

In the preferred embodiment of the present invention, referring to FIG. 4, the pool mounting mechanism 15 is a screw compressor clamp. The screw compressor clamp attaches the present invention to the rail top frame of the pool. The screw compressor clamp comprises a clamping arm 18, a second height-adjustment screw 16, a second female threaded hole 17, an engagement lip 19, and a second guiding rail 20. The engagement lip 19 and the clamping arm 18 act as two opposing supports which are used to apply a gripping force onto the frame of the pool. The engagement lip 19 is an elongated plate which overlaps onto a top surface of the rail top frame in order to vertically support the present invention. The engagement lip 19 is positioned coincident with the top wall 2 of the open-sided enclosure 1 and is adjacently connected to the open-sided enclosure 1. Additionally, the engagement lip 19 is positioned adjacent to the main opening 5 of the open-sided enclosure 1. When the present invention is attached to the frame of the pool, this design ensures that the main opening 5 of the open-sided enclosure 1 is facing towards the side of the pool; thus preventing debris and other contaminants from easily entering the open-sided enclosure 1.

The clamping arm 18 presses against a bottom surface of the rail top frame and secures the present invention in place. More specifically, the clamping arm 18 is oriented parallel to the engagement lip 19 and is positioned in between the bottom wall 3 of the open-sided enclosure 1 and the engagement lip 19. Referring to FIG. 1, in order to apply a clamping force onto the rail top frame opposite of the engagement lip 19, the clamping arm 18 extends out of the open-sided enclosure 1. The second height-adjustment screw 16, the second female threaded hole 17, and the second guiding rail 20 translate the clamping arm 18 towards and away from the engagement lip 19. The second female threaded hole 17 traverses through the clamping arm 18 and is oriented normal to the top wall 2 of the open-sided enclosure 1. The second female threaded hole 17 contains female threading complimentary to the second height-adjustment screw 16. The second height-adjustment screw 16 is rotatably mounted to the top wall 2 and the rear wall 4 of the open-sided enclosure 1. This allows the second height-adjustment screw 16 to rotate about its main axis. Additionally, the second height-adjustment screw 16 is threadably engaged to the second female threaded hole 17 in order to convert rotation motion of the second height-adjustment screw 16 into translation motion of the clamping arm 18. This allows the user to raise the clamping arm 18 towards the engagement lip 19 in order to attach the present invention to the frame of the pool.

The second guiding rail 20 is used to prevent the clamping arm 18 from rotating when the second height-adjustment screw 16 is being rotated. The second guiding rail 20 is positioned within the open-sided enclosure 1, adjacent and parallel to the second height-adjustment screw 16. The second guiding rail 20 is a rectangular extrusion that extends along the full length of the second height-adjustment screw 16 and is connected within the open-sided enclosure 1. The clamping arm 18 is slidably engaged along the second guiding rail 20. A head of the second height-adjustment screw 16 is positioned external to the top wall 2 of the open-sided enclosure 1 to allow the user to engage the screw compressor clamp.

To further secure the present invention to a rail top frame pool, an adjustable hook-like bracket 33 may be used. The adjustable hook-like bracket 33 is an L-shaped structure that laterally stabilizes the present invention when secured to the frame of the pool. The adjustable hook-like bracket 33, referring to FIG. 1, is positioned adjacent to the engagement lip 19, opposite the open-sided enclosure 1. The adjustable hook-like structure is slidably engaged against the engagement lip 19 and may be locked into place through the use of a thumbscrew. The adjustable hook-like bracket 33 may also include a securement hook. The securement hook attaches to the vertical portion of the rail top frame pool and further secures the present invention. The securement hook is slidably engaged to the adjustable hook-like bracket 33, opposite the engagement lip 19. The securement hook may be locked into place through the use of a thumbscrew.

Figure 5:
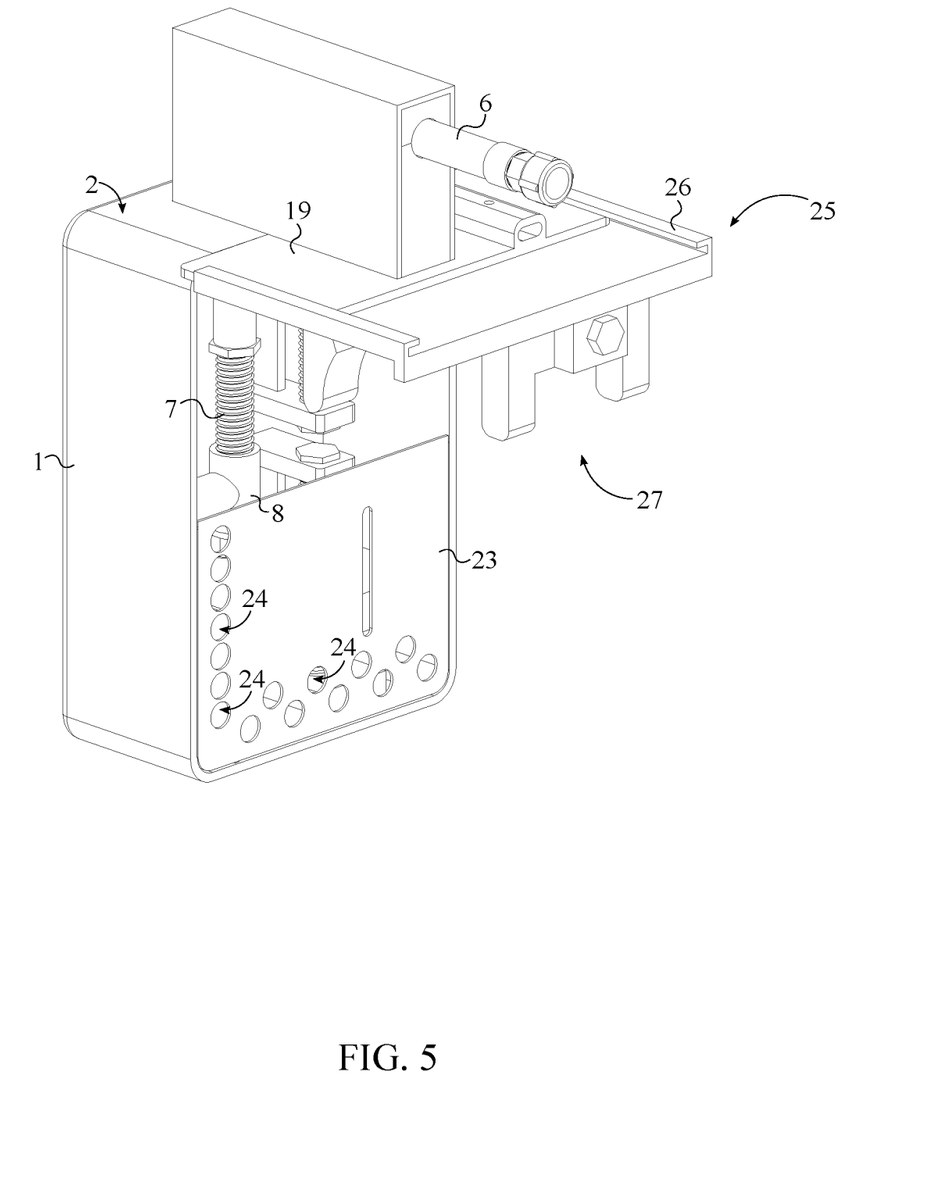
FIG. 5 is a perspective view of the present invention depicting the tube adaptor bracket.
Figure 6:
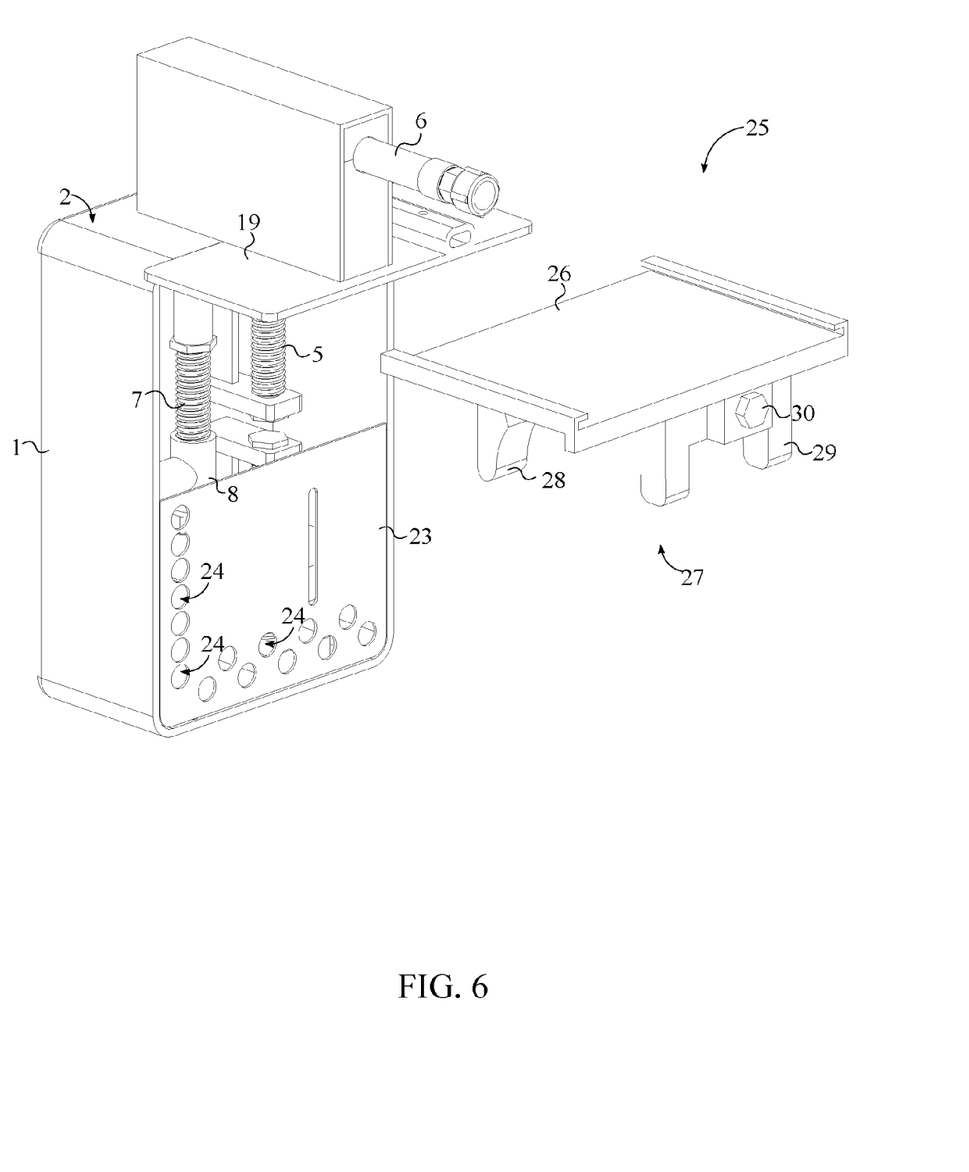
FIG. 6 is a partially exploded perspective view of the present invention depicting the tube adaptor bracket.

Referring to FIG. 5 and FIG. 6, in order to attach the present invention to a rail top frame pool, the present invention further utilizes a tube adaptor bracket 25. The tube adaptor bracket 25 comprises an adaptor plate 26 and an adjustable pipe clamp 27. The adaptor plate 26 is a slab of structural material which connects the tube adaptor bracket 25 to the engagement lip 19. More specifically, the adaptor plate 26 is oriented parallel to the engagement lip 19 and is slidably engaged to the engagement lip 19. This is achieved through a pair of L-shaped flanges. Each flange is adjacently connected to the adaptor plate 26, on either side of the adaptor plate 26. The adaptor plate 26 is secured in place by the clamping arm 18. More specifically, the clamping arm 18 is positioned pressing against the adaptor plate 26, opposite the engagement lip 19. The adjustable pipe clamp 27 is adjacently connected to the adaptor plate 26, adjacent to the main opening 5 of the open-sided enclosure 1 as seen in FIG. 5.

Figure 7:
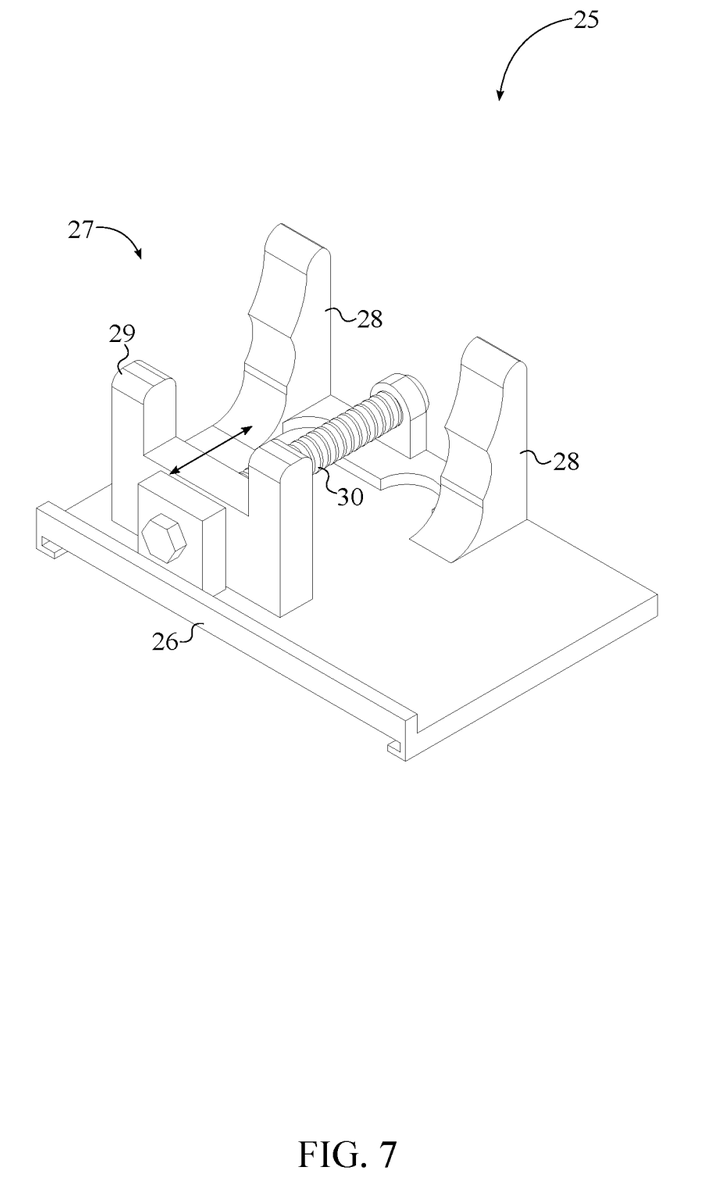
FIG. 7 is a bottom perspective view of the tube adaptor bracket.
Figure 8:
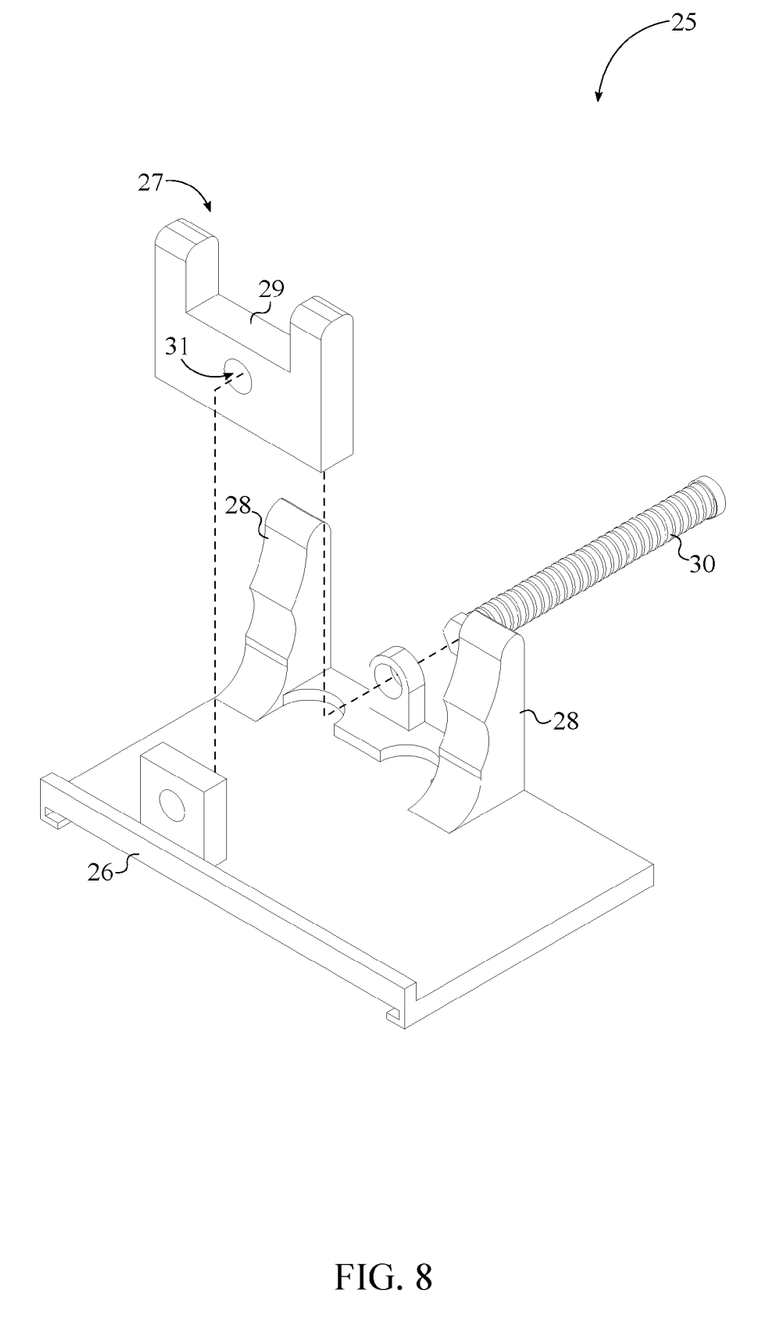
FIG. 8 is an exploded bottom perspective view of the tube adaptor bracket.

In one embodiment of the present invention, referring to FIG. 7 and FIG. 8, the adjustable pipe clamp 27 comprises a pair of fixed arms 28, a translating arm 29, a third female threaded hole 31, and a clamp screw 30. The pair of fixed arms 28 and the translating arm 29 act as two opposing supports which are used to apply a gripping force on to the railing of the rail top frame pool. The pair of fixed arms 28 is adjacently and normally connected to the adaptor plate 26. The pair of fixed arms 28 contains semi-circular indentations which are used to facilitate a flush engagement with the railing of the rail top frame pool. The translating arm 29 is oriented parallel to the pair of fixed arms 28 and is positioned adjacent to the pair of fixed arms 28. The third female threaded hole 31 traverses through the translating arm 29 and is oriented normal to the adaptor plate 26. The third female threaded hole 31 contains female threading complimentary to the clamp screw 30. The clamp screw 30 is positioned in between the pair of fixed arms 28 and is rotatably mounted to the adaptor plate 26. Additionally, the clamp screw 30 is threadably engaged to the third female threaded hole 31 in order to convert rotational motion of the clamp screw 30 into translation motion of the translating arm 29.

In order to utilize the present invention with a pipe top framed pool, first the desired water level is set by raising or lowering the water-level control valve 8 by rotating the first height-adjustment screw 13. The desired water level is described above. Next, the engagement lip 19 is positioned on top of the pipe top frame with the clamping arm 18 that is positioned directly under the pipe top frame. To secure the present invention, the second height-adjustment screw 16 is rotated until the clamping arm 18 is pressing against the pipe top frame. Additionally, the adjustable hook-like bracket 33 is positioned to press against the pipe top frame, opposite the open-sided enclosure 1 and secured in place through thumb screws. Once adequately secured, an external water supply hose is connected to the external portion of the inlet pipe 6 and turned on.

In order to utilize the present invention with a pipe top frame pool, first the desired water level is set by raising or lowering the water-level control valve 8 by rotating the first height-adjustment screw 13. The desired water level is described above. Next, the engagement lip 19 is positioned on top of the frame of the pool with the adjustable pipe clamp 27 coincident with the pipe-structured frame. To secure the present invention, the clamp screw 30 is rotated until the pipe-structured frame is firmly secured in between the pair of fixed arms 28 and the translating arm 29. Once adequately secured, an external water supply hose is connected to the external portion of the inlet pipe 6 and turned on.

Although the invention has been explained in relation to its preferred embodiment, it is to be understood that many other possible modifications and variations can be made without departing from the spirit and scope of the invention as hereinafter claimed.

What is claimed is:

1. An automatic water fill for above-ground pool comprises:
    an open-sided enclosure;

an inlet pipe;
an intermediate pipe;
a water-level control valve;
a pool mounting mechanism;
an actuatable lifter;
the inlet pipe traversing normal and into a top wall of the open-sided enclosure;
the inlet pipe being fixed to the open-sided enclosure;
the intermediate pipe, the water-level control valve, and the actuatable lifter being positioned within the open-sided enclosure;
the intermediate pipe being telescopically engaged into the inlet pipe;
the water-level control valve being fixed to the intermediate pipe, opposite to the inlet pipe;
the inlet pipe being in fluid communication with the water-level control valve through the intermediate pipe;
the pool mounting mechanism being mechanically integrated into the open-sided enclosure;
the actuatable lifter being attached in between a housing of the water-level control valve and the open-sided enclosure; and
the actuatable lifter comprises a lifter body, a first female threaded hole, and a first height-adjustment screw;
the lifter body being attached about the housing of the water-level control valve;
the first female threaded hole traversing through the lifter body;
the first female threaded hole being oriented normal to the top wall of the open-sided enclosure;
the first height-adjustment screw being rotatably mounted to a bottom wall of the open-sided enclosure and a rear wall of the open-sided enclosure;
and the first height-adjustment screw being threadably engaged to the first female threaded hole.

2. The automatic water fill for above-ground pool as claimed in claim 1 comprises:
the actuatable lifter further comprises a first guiding rail;
the first guiding rail being positioned within the open-sided enclosure;
the first guiding rail being positioned adjacent and parallel to the first height-adjustment screw;
the first guiding rail being adjacently connected within the open-sided enclosure; and
the lifter body being slidably engaged along the first guiding rail.

3. The automatic water fill for above-ground pool as claimed in claim 1 comprises:
an outlet pipe;
a partition;
the outlet pipe being adjacently connected to the water-level control valve;
the outlet pipe being in fluid communication with the water-level control valve;
the partition being positioned in between the outlet pipe and the housing of the water-level control valve; and
the partition being adjacently connected within the open-sided enclosure.

4. The automatic water fill for above-ground pool as claimed in claim 1 comprises:
a cover plate;
a plurality of flow holes;
the plurality of flow holes being distributed across the cover plate;
each of the plurality of flow holes traversing normal and through the cover plate;
the cover plate being positioned adjacent to the water-level control valve, opposite a rear wall of the open-sided enclosure; and
the cover plate being perimetrically attached to the open-sided enclosure.

5. The automatic water fill for above-ground pool as claimed in claim 1 comprises:
the pool mounting mechanism being a screw compressor clamp;
the screw compressor clamp comprises a second height-adjustment screw, a clamping arm, a second female threaded hole, and an engagement lip;
the engagement lip being positioned coincident with to the top wall;
the engagement lip being adjacently connected to the open-sided enclosure;
the engagement lip being positioned adjacent to a main opening of the open-sided enclosure;
the clamping arm being oriented parallel to the engagement lip;
the clamping arm being positioned in between a bottom wall of the open-sided enclosure and the engagement lip;
the clamping arm extending out of the open-sided enclosure;
the second female threaded hole traversing through the clamping arm;
the second female threaded hole being oriented normal to the top wall of the open-sided enclosure;
the second height-adjustment screw being rotatably mounted to the top wall of the open-sided enclosure and a rear wall of the open-sided enclosure; and
the second height-adjustment screw being threadably engaged to the second female threaded hole.

6. The automatic water fill for above-ground pool as claimed in claim 5 comprises:
a second guiding rail;
the second guiding rail being positioned within the open-sided enclosure;
the second guiding rail being positioned adjacent and parallel to the second height-adjustment screw;
the second guiding rail being adjacently connected within to the open-sided enclosure; and
the clamping arm being slidably engaged along the second guiding rail.

7. The automatic water fill for above-ground pool as claimed in claim 5 comprises:
an engagement lip of the pool mounting mechanism;
an adjustable hook-like bracket;
the adjustable hook-like bracket being positioned adjacent to the engagement lip, opposite the open-sided enclosure; and
the adjustable hook-like bracket being slidably engaged against the engagement lip.

8. The automatic water fill for above-ground pool as claimed in claim 1 comprises:
an engagement lip of the pool mounting mechanism;
a tube adaptor bracket;
the tube adaptor bracket comprises an adaptor plate and an adjustable pipe clamp;
the adaptor plate being oriented parallel to the engagement lip;
the adaptor plate being slidably engaged to the engagement lip;
a clamping arm of the pool attachment mechanism being pressed against the adaptor plate, opposite the engagement lip;

the adjustable pipe clamp being adjacently connected to the adaptor plate; and the adjustable pipe clamp being positioned adjacent to a main opening of the open-sided enclosure.

9. The automatic water fill for above-ground pool as claimed in claim 8 comprises:

the adjustable pipe clamp comprises a pair of fixed arms, a translating arm, a third female threaded hole, and a clamp screw;

the pair of fixed arms being adjacently and connected normal to the adaptor plate;

the translating arm being oriented parallel to the pair of fixed arms;

the third female threaded hole traversing through the translating arm;

the third female threaded hole being oriented parallel to the adaptor plate;

the translating arm being positioned adjacent to the pair of fixed arms;

the clamp screw being positioned in between the pair of fixed arms;

the clamp screw being threadably engaged to the third female threaded hole; and the clamp screw being rotatably mounted to the adaptor plate.

10. The automatic water fill for above-ground pool as claimed in claim 1 comprises:

a horizontal spirit level; and the horizontal spirit level being adjacently connected to the top wall.

* * * * *